Dec. 10, 1968

R. W. CHAMBERS 3,415,133

VARIABLE AMPLITUDE DRIVE

Filed June 21, 1966

INVENTOR
ROBERT W. CHAMBERS

BY

ATTORNEY

Dec. 10, 1968 R. W. CHAMBERS 3,415,133
VARIABLE AMPLITUDE DRIVE
Filed June 21, 1966 3 Sheets-Sheet 2

United States Patent Office 3,415,133
Patented Dec. 10, 1968

3,415,133
VARIABLE AMPLITUDE DRIVE
Robert W. Chambers, Willingboro, N.J., assignor, by mesne assignments, to the United States of America as represented by the Secretary of the Navy
Filed June 21, 1966, Ser. No. 560,964
3 Claims. (Cl. 74—53)

ABSTRACT OF THE DISCLOSURE

This invention relates to a means for changing the amplitude of the rectilinear movement of a driven member while the member is in motion. The drive means comprises a pivotally mounted lever arm one end of which is coupled to the driven member and the other end of which is reciprocated by a cam and follower arrangement to cause the lever arm to pivot about its fulcrum. The fulcrum is movable relative to the ends of the lever arm to enable adjustment of the proportionate lengths of the arm on either side of the fulcrum and thus to vary the amplitude of movement of the driven member. The fulcrum is mounted on a carriage movable by means of a worm and wheel arrangement powered by a shift motor to provide continuous variation in the amplitude of motion of the driven member. A snap action spring drive mechanism is provided to snap the carriage to its final position after initial movement thereof by the shift motor.

---

The present invention relates generally to a variable amplitude drive and, more particularly, to a mechanical means for changing the amplitude of a driven member, as for example, a crosshead.

Heretofore, control systems for changing the amplitude of some specific driven member have been designed which include the provision of a pivotable lever arm in engagement at one end thereof with the member to be driven while the arm's other end is oscillated thereby causing the driven member to vibrate to an extent governed by the proportionate lengths of the arms on either side of the pivotable bearing point. Such a system has also been provided with a force multiplying means for varying the amplitude of the driven member by moving the pivot or fulcrum of the arm. This means, however, has normally been of the mechanical hand-manipulated type such that, although a variety and diversity in the amplitudes may be achieved, no automatic scanning of the amplitudes is possible nor may the amplitudes be instantaneously altered as required in a complex system.

Accordingly, it is an object of the present invention to provide a variable amplitude drive which includes means for driving any element where a variable amplitude is required with the number of amplitudes being infinite between limits or in steps.

Another object of the present invention is to provide a means for automatically changing the amplitude of a driven member by employing an amplitude shift motor.

A further object of the present invention is to provide a motor driven control for the position of the lever arm fulcrum in a variable amplitude drive thereby permitting a continuous and automatic amplitude variation.

Figure 1:
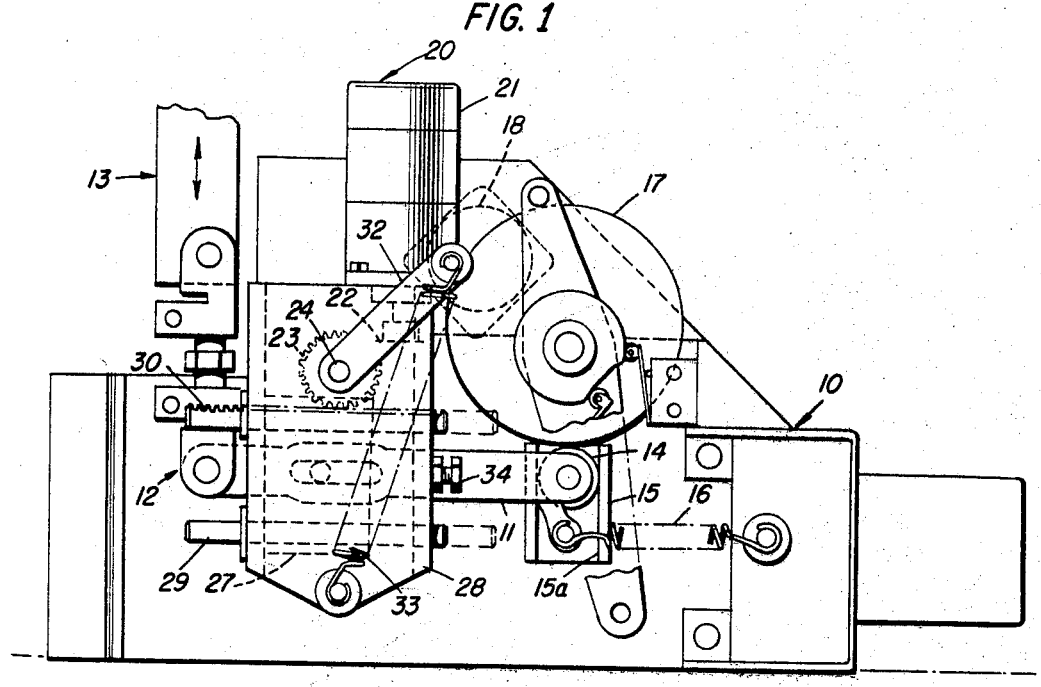
Figure 2:
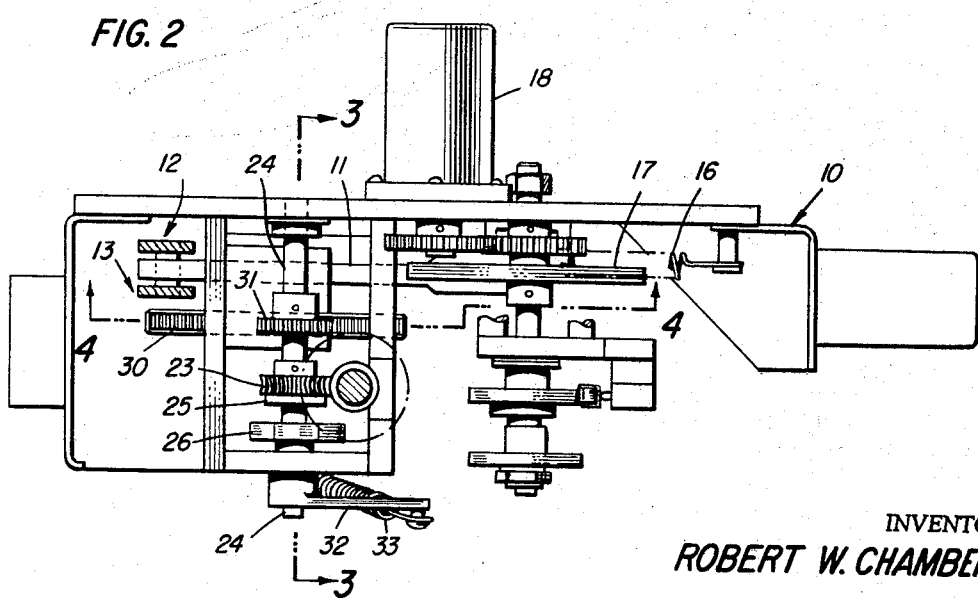
Figure 3:
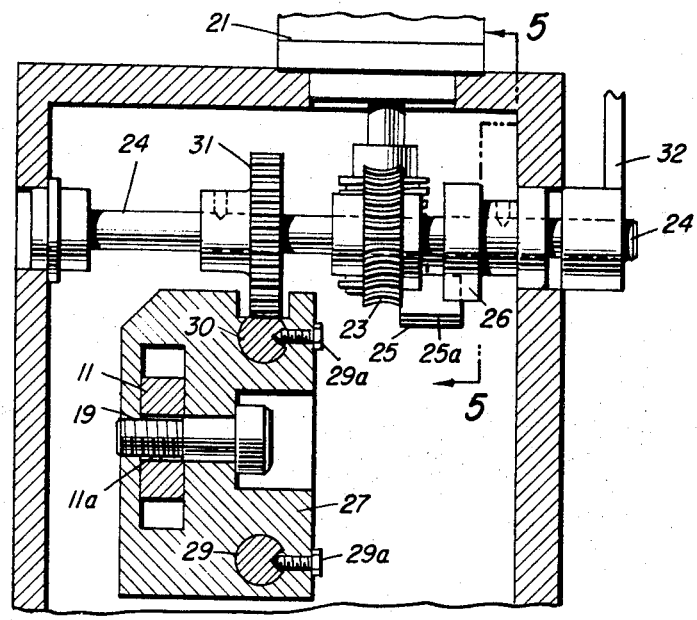
Figure 4:
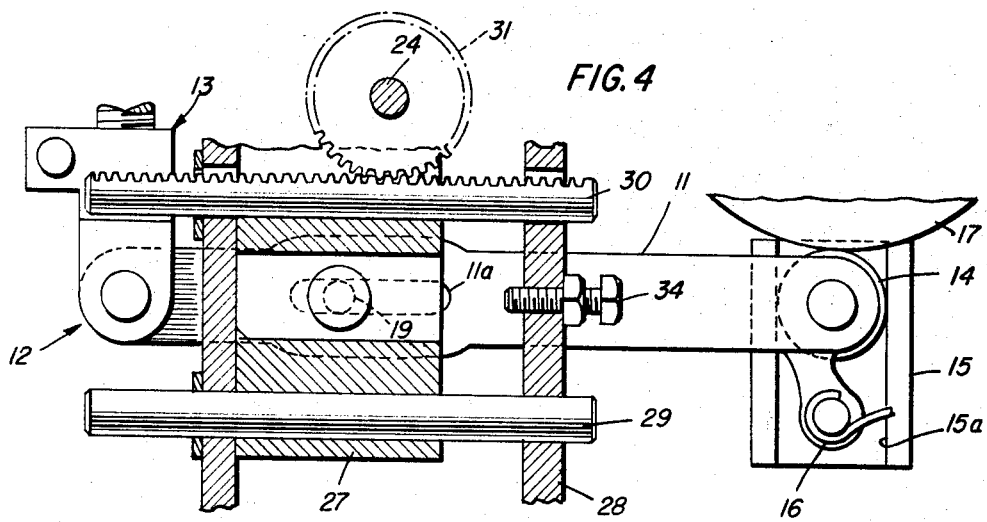
Figure 5:
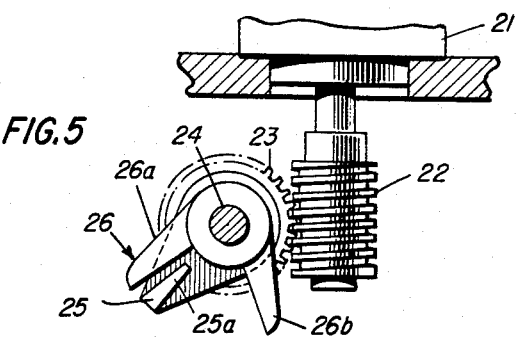
Figure 6:
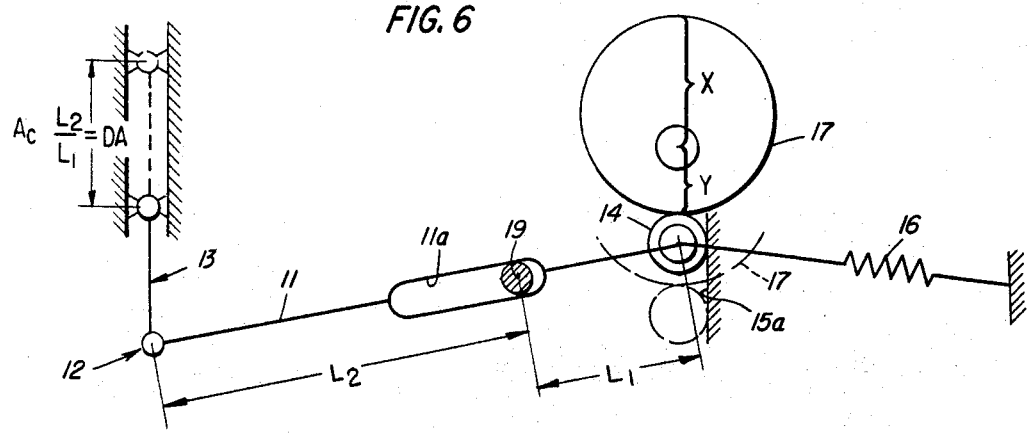
Figure 7:
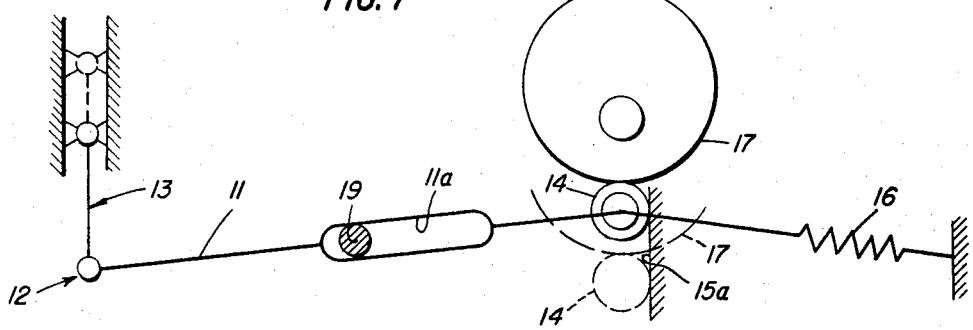

Other objects, advantages and novel features of the present invention will become apparent from the following detailed description of the invention when considered in conjunction with the accompanying drawings wherein:

FIG. 1 is a side elevational view of the variable amplitude drive of the present invention;
FIG. 2 is a top view of the variable amplitude drive;
FIG. 3 is a sectional view taken at line 3—3 of FIG. 2;
FIG. 4 is a sectional view taken at line 4—4 of FIG 2;
FIG. 5 is a sectional view taken at line 5—5 of FIG. 3;
FIG. 6 is a schematic showing the basic mechanics of the present invention; and
FIG. 7 is a schematic similar to FIG. 6 showing how a shift of the fulcrum varies the amplitude of the system.

In FIGS. 1–5 of the drawings, the variable amplitude drive or control system 10 of the present invention is shown having a pivotable rocker arm 11 hingedly secured at one end as at 12 to a crosshead assembly 13 for longitudinally reciprocating the assembly in the direction of the arrows shown in FIG. 1. The crosshead may serve any desirable purpose in a mechanical system. Arm 11 is pivotable around an axis perpendicular to the crosshead 13 longitudinal axis. At the other end of arm 11, a cam follower 14 is secured and is made to reciprocate in a vertical direction while in contact against surface 15a of member 15. Follower 14 is held against surface 15a by means of a spring 16. A cam 17, driven by a motor 18, FIG. 2, moves follower 14 in a vertical up-and-down direction thereby imparting a rocking motion to arm 11 about its pivotal axis or fulcrum 19 as cam 17 revolves.

In order to continue with the description of the invention, a brief discussion of the basic mechanics involved will be made. In FIGS. 6 and 7 of the drawings, cam follower 14 is caused to rise and fall through an amplitude $A_c$ equal to $x$–$y$, respectively the velocity depending on the profile and the angular velocity of cam 17. The Vertical Double amplitude DA, of the end of crosshead 13 will be determined by the ratio $L_1$ to $L_2$ and amplitude $A_c$ which is constant. It is possible then to change DA by changing the position of fulcrum 19 which simply changes the $L_2/L_1$ ratio.

An automatic drive assembly 20 is provided for moving pivotal axis 19 of arm 11 (thereby changing the $L_2$ to $L_1$ ratio) between the ends of an elongated slot 11a in order to cause a variation of the amplitude of the reciprocating crosshead 13. Assembly 20 includes a shift motor 21 mounted on the top side of control system 10. A worm 22 is provided on motor 21 in meshing engagement with a wormwheel or gear 23 mounted on a shaft 24 so as to freely rotate thereon. Associated with gear 23 is a pawl 25 keyed thereto such that upon actuation of worm gear 23 through worm 22, the pawl is caused to freely rotate about shaft 24 along with gear 23. Keyed to shaft 24 is a yoke 26 having two arms 26a, 26b, in a common plane with a laterally extending portion 25a of pawl 25 such that shaft 24 is caused to turn about its longitudinal axis as yoke 26 is rotated. When shift motor 21 is energized thereby actuating worm 22, wormwheel 23 and its associated pawl 25 is caused to freely rotate about shaft 24. Extension 25a of pawl 25 will contact arm 26a of yoke 26 upon a rotation of wormwheel 23 in a clockwise direction. A rotation in a counter-clockwise direction will cause extension 25a to contact arm 26b for purposes to be described hereinafter.

Pivotal axis or fulcrum 19 of arm 11 is moved throughout slot 11a by means of a carriage 27. Rocker arm 11 projects through carriage 27 as clearly shown in FIGS. 3 and 4 and is held therein by a headed screw or its equivalent in the conventional manner. The carriage is held in position by a mounting 28 and bars 29, 30, bar 30 being a rack bar and bar 29 being a support bar. Bars 29, 30 are free to slide within mounting 28 but are keyed to carriage 27 by screws 29a in order for carriage 27 to move in a horizontal direction when the rack bar 30 is acutated. A pinion gear 31 is keyed to shafts 24 such that upon rotation thereof, bar 30 is caused to move as it meshes with the teeth on gear 31. An arm 32 is also keyed at one end thereof to shaft 24. The other end of arm 32 has attached thereto a spring 33 for maintaining arm 32 in the position shown in Fig. 1, thereby holding carriage 27 against one end of mount 28.

When motor 21 is energized at a time when motor 18 is operating, shaft 24 is caused to rotate in a counter-clockwise direction after extension 25a contacts arm 26b of yoke 26. Arm 32 will also revolve about axis 24, and, when the arm passes through its vertical position, spring 33 pulls arm 32 to its extreme counter-clockwise position, causing carriage 27 to move to the extreme right position at rest with stop 34. Stop 34 is a threaded screw or its equivalent capable of projecting in or out of amount 28 in order to adjust the extreme right position of carriage 27. Of course, a similar stop could be provided also for the extreme left position. Motor 21 therefore supplies the carriage 27 driving force for slightly more than one-half of the motion of carriage 27 and spring 33 completes the motion and holds carriage 27 firmly in the desired position against stop 34. The clearance in yoke 26 between arms 26a and 26b is sufficient to allow this spring driven motion. When carriage 27 arrives at its final position, a micro-switch, not shown, is closed. This switch, operating through a suitable relay turns off motor 21. The electrical arrangement is such that motor 21 will rotate in the opposite direction, i.e., move carriage 27 back to its position shown in FIGS. 1 and 4 when the system is re-energized, causing the pivotal axis or fulcrum 19 to return to the extreme left-hand position.

An alternate manner of controlling the position of fulcrum 19 and therefore the amplitude of crosshead assembly 13, is to sense the linear position of bar 30, or the angular position of shaft 24 thereby making a closed loop servomechanism which will control the position of fulcrum 19 continuously by driving motor 21 to null the linear or angular position pick-off. Such an alternate method allows an infinite number of amplitude settings to be achieved.

From the foregoing, it is evident that a means has been devised whereby the amplitude of a reciprocating crosshead can be varied while the system is operating, in a manner that is automatic, easy to operate, simple in manufacture and in expensive in use.

Obviously many modifications and variations of the present invention are possible in light of the above teachings. It is therefore to be understood that within the scope of the appended claims the invention may be practiced otherwise than as specifically described.

What is claimed is:
1. A control system for varying the amplitude of the reciprocating crosshead comprising:
   a pivotable rocker arm secured at one end thereof to a crosshead, said rocker arm being pivotable around an axis perpendicular to the crosshead longitudinal axis;
   a cam follower secured to the other end of said arm;
   guide means for confining said follower to rectilinear motion in a vertical direction;
   a motor driven cam in engagement with said follower for imparting a reciprocatory motion to said follower and a rocking motion to said arm about the pivot;
   motor driven means for horizontally moving the pivotal axis of said arm to thereby vary the amplitude of the reciprocating crosshead; and
   spring means for moving the pivotal axis of said arm to its final position after initial movement thereof by said motor driven means.

2. The control system of claim 1 wherein said motor driven means comprises:
   a shift motor;
   a worm;
   a shaft;
   a worm gear freely rotatable on said shaft and having a laterally extending pawl thereon;
   a yoke secured to said shaft;
   a pinion gear secured to said shaft; and
   a rack means containing the pivotal axis of said arm, said rack means being co-operable with said pinion gear such that upon energization of said shift motor, said worm will mesh with said worm gear after which said pawl will be made to contact an arm of said yoke to thereby rotate said shaft with said pinion gear thereon and move the pivotal axis of said arm.

3. The control system of claim 2 wherein said rack means comprises:
   a horizontally disposed rack bar;
   a horizontally disposed support bar vertically spaced from said rack bar;
   a carriage containing the pivotal axis of said arm, said carriage being mounted on said rack bar and said support bar; and
   a frame slideably supporting said rack bar and said support bar between limits whereby the movement of the pivotal axis is governed by the extent of movement of said carriage within said frame.

References Cited
UNITED STATES PATENTS

| | | | |
|---|---|---|---|
| 1,385,969 | 7/1921 | Norton | 74—425 |
| 2,119,567 | 6/1938 | Williams | 74—53 |
| 2,253,183 | 8/1941 | Le Count. | |
| 2,387,771 | 10/1945 | Rosenbrook | 74—53 |
| 3,032,854 | 5/1962 | Bruyere. | |
| 3,208,298 | 9/1965 | Pickles | 74—411 |
| 3,344,685 | 10/1967 | Crouzet | 74—569 |

FRED C. MATTERN, Jr., *Primary Examiner.*

W. S. RATLIFF, *Assistant Examiner.*